3,449,897
HAYMAKING MACHINE AND METHOD OF OPERATING SAME
Robert G. Chombart, Paris, France, assignor to Maschinenfabrik Fahr A.G., Kreis, Konstanz, Germany, a corporation of Germany
Filed July 5, 1966, Ser. No. 562,710
Claims priority, application France, July 7, 1965, 23,745
Int. Cl. A01d 81/00
U.S. Cl. 56—366      3 Claims

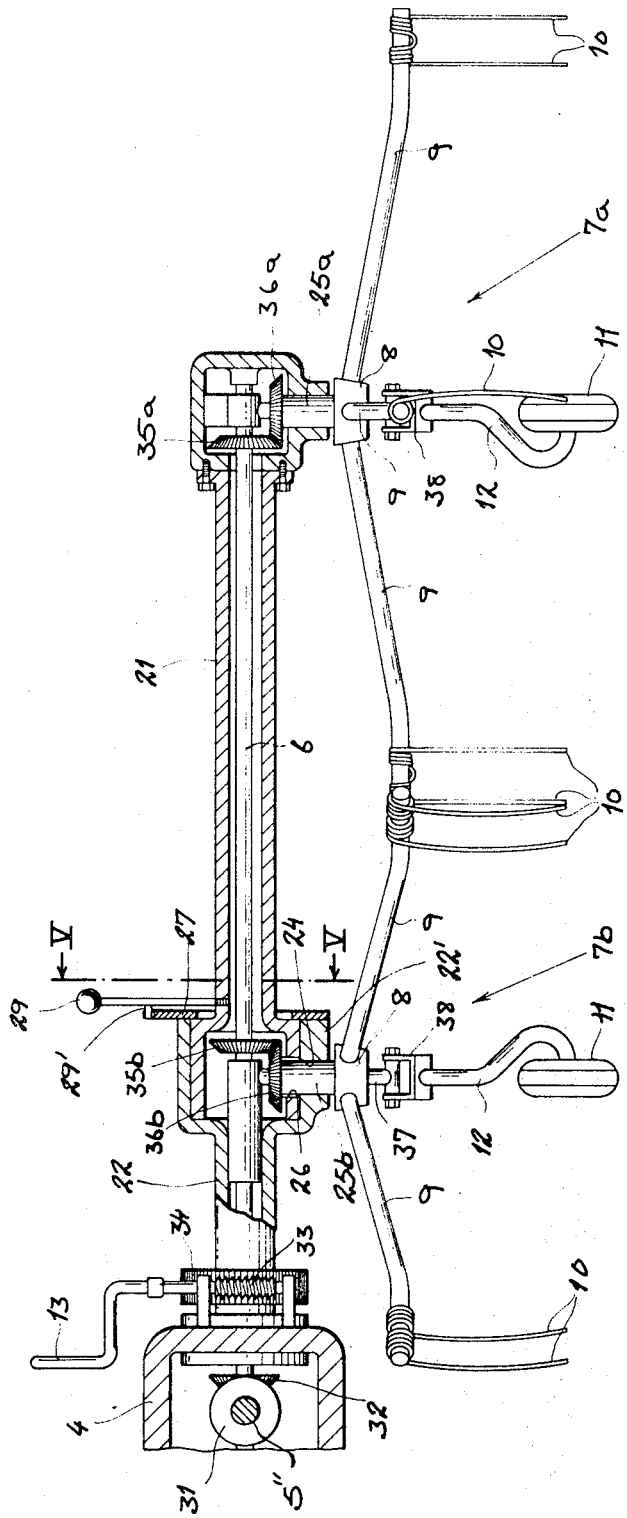
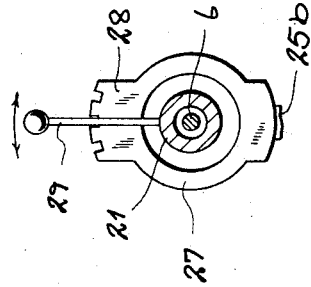
Fig. 4
Fig. 5
INVENTOR.
ROBERT G. CHOMBART
Karl F. Ross
Attorney

United States Patent Office 3,449,897
Patented June 17, 1969

ABSTRACT OF THE DISCLOSURE

A tedding machine in which a plurality of rakes are rotatable about generally vertical axes and have radial arms whose depending prongs entrain the hay. The prongs move in intersecting orbits in opposite senses and in interleaved relationship while the support has a plurality of interconnected tube sections which are limitedly rotatable about a common axis corresponding to the axis of the drive shaft for the rakes.

---

My present invention relates to a haymaking machine having means for picking up loose stalks and redistributing them in different manner on the field, e.g. for piling up scattered stalks of crop material into swaths or windrows or for tedding the piled-up stalks. The invention also relates to a method of operating such machine.

It is frequently necessary to change the mode of operation of haymaking machinery to suit different crops and/or weather conditions. Thus, for example, freshly mown grass may be initially formed into relatively broad swaths which, after tedding, may be replaced by narrower windrows designed to reduce overnight moisture collection.

In general, the turning and redistribution of such crop material can be effectively carried out with the aid of a machine, usually designed for towing by a tractor, which comprises a plurality of rotary rakes with interleaved prongs arranged in a row perpendicular to the direction of motion, adjoining rakes rotating in opposite directions so that their depending, preferably resilient prongs pick up the loose stalks and rearrange them in a manner determined by the sense of rotation and, to some extent, by their rotary speed relative to the forward speed of the unit. Heretofore, changes in the pattern of scattering or piling could be brought about only, in a somewhat cumbersome way, through variations in speed and readjustment of the relative spacing of the axes of rotation of adjacent rakes; thus, it has heretofore been the practice to form windrows by making the peripheral speed of the rakes equal to the ground speed of the vehicle whereby, along every other orbital intersection, the prongs would remain substantially stationary with reference to the ground so that the stalks would no longer be entrained and would drop to the surface.

The general object of this invention is to provide (a) a machine of the character described which can be speedily adapted to different modes of operation and (b) a method of so operating such machine that, without making structural changes, the various modes of piling or scattering may be realized at will.

I have found, in accordance with this invention, that the foregoing object may be achieved by mounting adjacent rakes on a common support with freedom of relative adjustment of the inclination of their axes of rotation with reference to the vertical, within vertical planes parallel to the direction of motion, this feature permitting the rakes to be selectively inclined with either a lower front portion or a lower rear portion of the orbital paths of their prongs. Since the rakes are suspended at the upper ends of their generally vertical shafts, a rearward inclination of such shaft (and thereby of the axis of rotation) will raise the rear sector of the orbit of the corresponding rake whereas a forward inclination will have the opposite effect. If, now, the rake is rearwardly inclined so that the prongs are lifted off the ground in traversing the rear half of their path, they will leave the entrained stalks behind them unless these stalks have been picked up by the interleaved prongs of an adjoining rake with opposite inclination which will sweep them along the ground and either release them after another rotation of approximately 180° or transfer them to yet a third rake having substantially the same inclination as the first one. In general, the stalks will be deposited on the ground only by the rearwardly inclined rakes, near the ascending part of their orbits, thus—in the case of four rakes with outwardly rotating lower edges—at the center of the array if the two inner rakes are rearwardly inclined or at the sides of the array if the two outer rakes have such an inclination. Hence, by tilting the two inner rakes in one sense and the two outer rakes in the opposite sense, I can deposit the stalks in a narrow windrow centrally of the array or pile them up along its sides according to which of the two rake pairs are tilted forwardly and which are inclined rearwardly. On the other hand, inclination of all rakes toward the rear will allow a substantially uniform scattering (tedding) of the stalks if the peripheral speed of the rakes is greatly different from ground speed, it being no longer necessary to provide means for changing the rake velocity so that windrows may be formed along those points where the intermeshing prongs are substantially stationary with reference to the ground.

The invention will be described in greater detail with reference to the appended drawing in which:

FIG. 4 is a fragmentary view, in longitudinal section, of the supporting structure for the rake assembly; and FIG. 5 is a cross-sectional view taken on the line V—V of FIG. 4.

Figure 1:
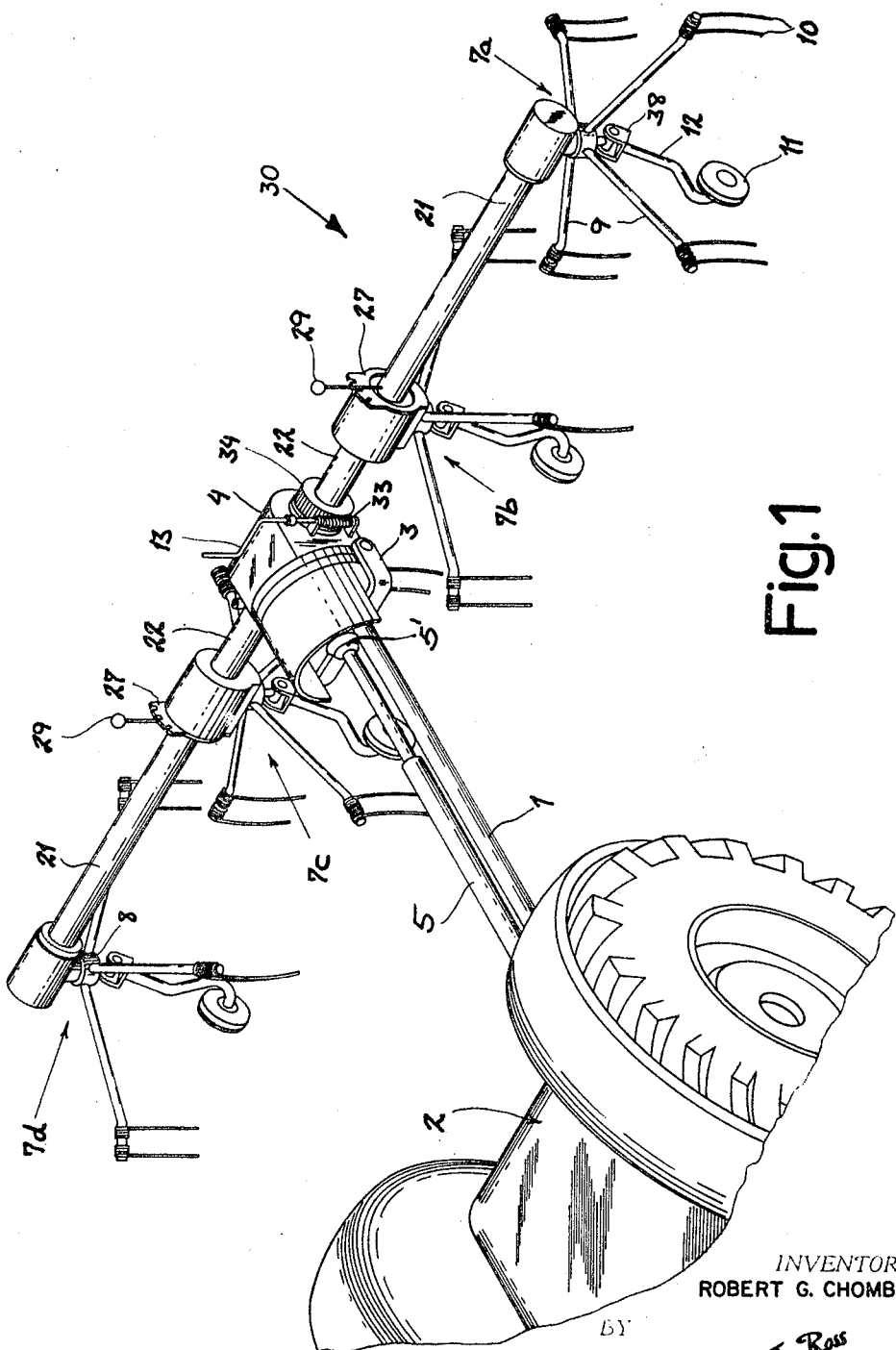
FIG. 1 is a perspective view of a haymaking machine, representing a preferred embodiment, attached to a tractor.

As illustrated in FIG. 1, a haymaking unit generally designated 30 is connected with a tractor 2 via a tow bar 1 having a bifurcate rear end 3 pivotally linked with a transmission housing 4. A shaft 6 projects transversely from the housing 4 on opposite sides thereof and is driven, by way of an intermediate shaft 5 of variable length, a universal joint 5' and an extension 5" of that shaft as well as two bevel gears 31, 32 (see also FIG. 4), from the power-take-off shaft (not shown) of the tractor. Shaft 6 is surrounded, on each side of housing 4, by a tubular shell composed of interconnected sections 21, 22.

A set of four rotary rakes 7a, 7b, 7c, 7d (see also FIGS. 2 and 3) depend from the supporting structure 21, 22 from which they are suspended with the aid of respective shafts 25a, 25b, etc. The two outer shafts, such as shaft 25a, are supported on the free ends of the respective tube sections 21; the two inner shafts, as particularly illustrated for shaft 25b, pass through arcuate slots 26 in tube sections 21 and through bores 24 in enlarged heads 22' of tube sections 22 whereby the position of these latter shafts is uniquely determined by that of tube sections 22 and can be adjusted independently, within the limits of slot 26, of the position of tube sections 21.

Tube sections 22 are journaled in housing 4 for limited rotation under the control of respective worms 33 meshing with worm gears 34, the worms 33 being fitted with heads engageable by a hand crank 13 for individual rotation.

A collar 27 is rigid with head 22', as by being welded thereto, and has a notched upward extension 28 adjacent a lever 29 which projects upwardly from tube 21. Lever 29 has a spur 29', adapted to engage in any of the notches of extension 28, and is sufficiently flexible in a vertical axial plane to permit withdrawal of the spur from the engaged notch. Manual rotation of the lever with reference to collar 27 changes the relative angular position of tube sections 21, 22, the chosen position being maintained by the cooperation of spur 29' with indexing element 28. Collar 27 bears upon a shoulder of tube section 22 to hold the assembly 21, 22 together.

Shaft 6 carries four bevel gears 35a, 35b, etc. which mesh with respective bevel gears 36a, 36b, etc. on shafts 25a, 25b, etc. journaled in tube sections 21 and 22. Each of the rakes 7a–7d has a center disk 8 from which four arms 9 project substantially radially at right angles to one another, the arms of neighboring rakes being relatively offset by about 45° so that their ends, having pairs of resilient prongs 10 suspended therefrom, intermesh as the rakes rotate in relatively opposite senses; see particularly FIGS. 2 and 3. The shafts 25a, 25b, etc. are tubular and traversed by a fixed stem 37 holding a boss 38 in position beneath disk 8; and arm 12 is adjustably secured to this boss and carries at its lower end a guide wheel 11 supporting the respective rake at a suitable distance above ground.

Figure 2:
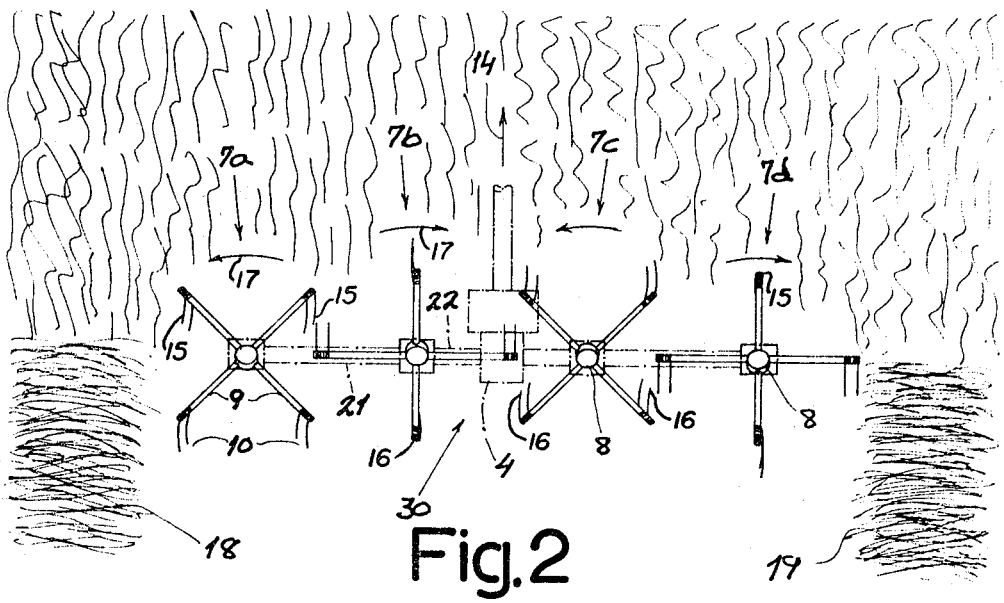
FIGS. 2 and 3 are top views of the rake assembly of the machine illustrated in FIG. 1, shown with different relative inclinations of the rake axes.

In FIG. 2 I show the two inner rakes 7b, 7c forwardly inclined so that their prongs 10 sweep the ground behind the support 21, 22 while being lifted off the ground in front of the support; the reverse position has been illustrated for the outer rakes 7a and 7d. With this arrangement the unit 30, moving forwardly in the direction of arrow 14, piles the encountered crop material along its sides in two rows 18, 19, the stalks being picked up at the lowered forward edges 15 of rakes 7a, 7d and at the lowered rearward edge 16 of rakes 7b, 7c with the result that, upon rotation of these rakes in the directions indicated by arrows 17, the stalks are transferred from the inner rakes 7b, 7c to the outer rakes 7a, 7d before being released by the rearwardly and upwardly moving prongs of the latter.

Figure 3:
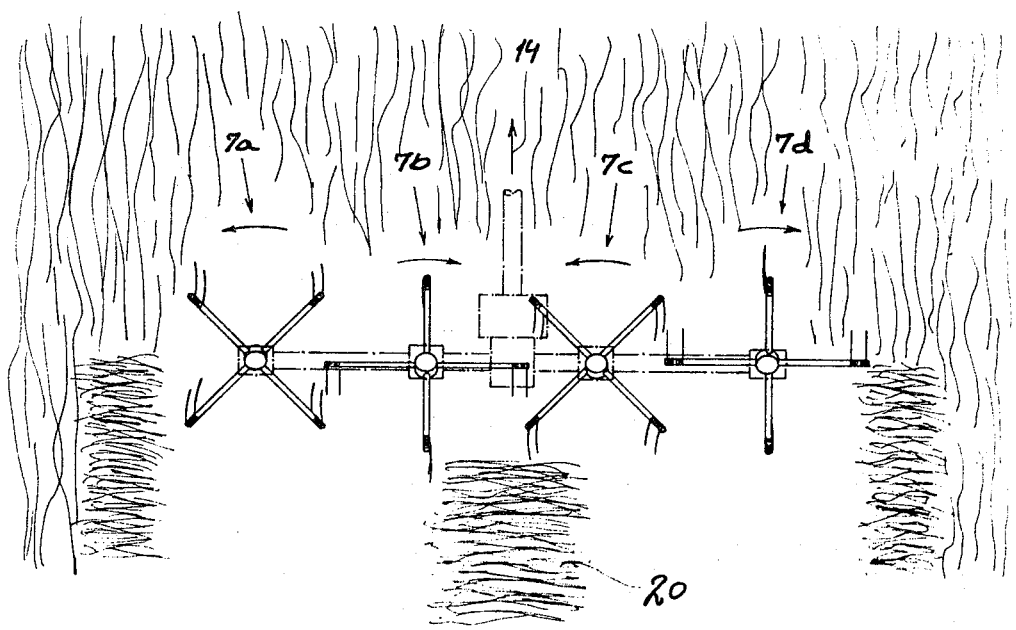

In the position illustrated in FIG. 3, in which the sense of rotation of the rakes is the same as in FIG. 2, the inner rakes 7b, 7c have been tilted forwardly and the outer rakes 7a, 7d are rearwardly inclined. Now, the stalks swept up by the outer rakes are transferred to the inner rakes and are deposited in a windrow 20 along the centerline of the unit where the intermeshing prongs of rakes 7b and 7c move upwardly and rearwardly. Because of the chosen inclination of the axes of rotation of the inner rakes, their peripheral speed (and therefore the speed of prongs 10) need not equal the ground speed of the vehicle (arrow 14) to produce the windrow 20.

If only two oppositely inclined rakes were provided, i.e. if the outer rakes 7a, 7d were omitted and if in FIG. 2 the inclination of one of the remaining rakes were reversed with concurrent inversion of their sense of rotation, the system would function either in the manner of rakes 7a, 7b (forming a pile 18 on the left) or in the manner of rakes 7c, 7d (forming a pile 19 on the right), according to whether the rake 7b or the rake 7c was tilted to the rear. If the sense of rotation were the same as in FIG. 2 (arrows 17), windrow 20 would reappear but with a shift to one or the other side of the centerline. The number of rakes could also be extended beyond the two pairs illustrated, with creation of additional windrows in the wake of the rearwardly tilted rakes.

I claim:

1. A haymaking machine comprising a substantially horizontal elongated support; wheel means on said support enabling travel thereof across a field in a direction perpendicular to its principal dimension; shaft means journaled on said support and extending in the direction of said principal dimension; drive means for rotating said shaft means; a plurality of rakes suspended from said support and coupled with said shaft means for rotation about generally vertical axes, said rakes having generally radial arms with depending pronges describing intersecting orbits along which the prongs of adjacent rakes are oppositely movable in interleaved relationship; and mounting means securing said rakes to said support with limited adjustability of the axes of rotation of adjacent rakes in opposite directions with reference to the vertical, in respective vertical planes parallel substantially perendicular to said support, whereby stalks of crop material lying on said field can be picked up and selectively distributed in different ways behind the advancing machine, said support comprising a purality of interconnected tube sections which are at least limitedly rotatable with reference to each other about a common axis, said mounting means including individual rake shafts journaled in respective tube sections.

2. A machine as defined in claim 1 wherein said rakes include an inner pair of rakes and an outer pair of rakes, said support further comprising a housing having two of said tube sections projecting from opposite sides thereof with said inner pair of rakes suspended therefrom, said two of said tube sections being at least limitedly rotatable about a common axis with reference to said housing.

3. A machine as defined in claim 1 wherein said prongs are pairs of spring wires.

References Cited

FOREIGN PATENTS

| | | |
|---|---|---|
| 579,309 | 7/1959 | Canada. |
| 1,352,635 | 1/1964 | France. |
| 1,352,607 | 1/1964 | France. |
| 1,352,702 | 1/1964 | France. |
| 1,154,303 | 9/1963 | Germany. |

ABRAHAM G. STONE, *Primary Examiner.*

P. A. RAZZANO, *Assistant Examiner.*